United States Patent [19]

Frisch

[11] 4,032,164
[45] June 28, 1977

[54] SHOPPING CART SHELF ASSEMBLY

[76] Inventor: Donald H. Frisch, 6759 Mineral Drive, San Diego, Calif. 92119

[22] Filed: June 25, 1976

[21] Appl. No.: 699,805

[52] U.S. Cl. .......................................... 280/33.99 A
[51] Int. Cl.² ............................................. B62B 5/00
[58] Field of Search ............. 280/33.99 A, 33.99 B, 280/33.99 R; 186/1 AC

[56] References Cited

UNITED STATES PATENTS

| | | | |
|---|---|---|---|
| 2,889,151 | 6/1959 | Sides | 280/33.99 B |
| 3,251,543 | 5/1966 | Bush et al. | 280/33.99 A |
| 3,503,622 | 3/1970 | Romero | 280/33.99 F |
| 3,912,291 | 10/1975 | Frisch | 280/33.99 A |

FOREIGN PATENTS OR APPLICATIONS 1,383,543   2/1975   United Kingdom ........ 280/33.99 A Primary Examiner—Joseph F. Peters, Jr.
Assistant Examiner—David M. Mitchell
Attorney, Agent, or Firm—Isbell & Charmasson

[57] ABSTRACT

A shopping cart shelf assembly dimensioned and adapted for attachment to a conventional shopping cart resulting in a horizontally oriented elongated surface in vicinity of the cart push handle which can be utilized for checking off a grocery list or writing checks thereon while standing in a checkout line. The shelf mounting assembly is coupled to the shelf and the cart in a manner for adapting to a standard type of shopping cart.

5 Claims, 4 Drawing Figures

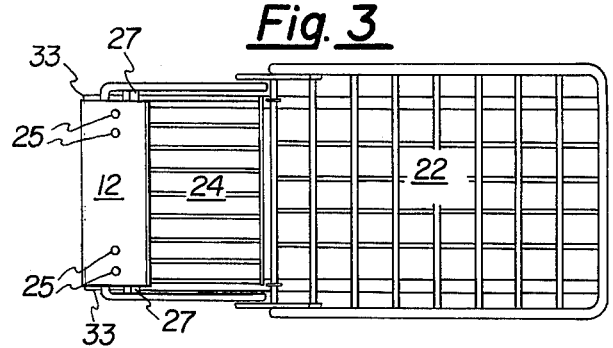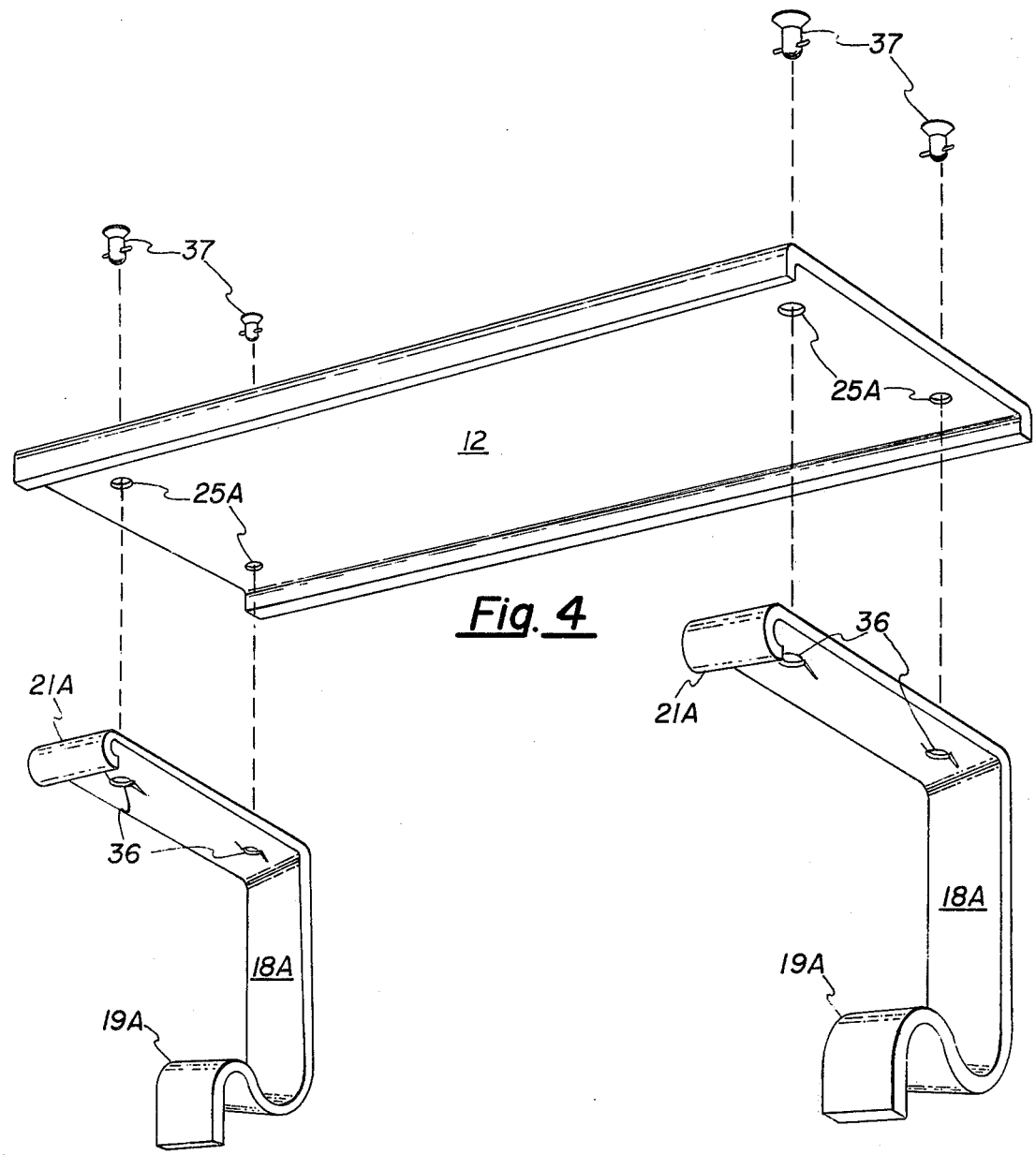

SHOPPING CART SHELF ASSEMBLY

PRIOR ART

The following patents were cited by the Examiner in the prosecution of U.S. Pat. No. 3,912,291 for a Shoppisg Cart Shelf Assembly granted to the instant applicant:

| UNITED STATES PATENTS | | | | |
|---|---|---|---|---|
| Pat. No. | Date | Patentee | Class | Subclass |
| 3,251,543 | 5/1966 | Bush et al. | 280 | 33.99A |
| 2,888,761 | 6/1959 | Miller | 280 | 33.99A |
| 3,539,204 | 11/1970 | Keller | 40 | 10R |
| 3,265,297 | 8/1966 | Behrens | 280 | 33.99A |
| 3,026,122 | 3/1962 | Young | 280 | 33.99H |
| 905,737 | 12/1908 | McCombe | 211 | 135 |

| FOREIGN PATENT | | | | | |
|---|---|---|---|---|---|
| Pat. No. | Date | Country | Name | Class | Subclass |
| 252,120 | 2/1967 | Austria | Keitler | 280 | 33.99H |

BRIEF DESCRIPTION OF THE INVENTION

The present invention relates to a shopping cart shelf assembly and, more particularly, to a shopping cart assembly having built-in mounting hardware adapted for mounting to an existing shopping cart.

According to the invention, a shopping cart shelf is provided for attachment to an existing shopping cart at the push-handle portion of the shopping cart and the back region thereof, which serves as a surface for writing checks while standing in a checkout line or checking off grocery lists, etc. The type of cart that the instant shelf assembly is particularly adapted to is the substantially horizontally rectangular cross-sectioned basket cart having a back portion for carrying small childern and a forward position which tilts upwardly 90°to when in a standby or stacked condition. The mounting bracket assembly has a pair of mounting steps or rods coupled underneath thereof and extending downwardly therefrom. One end of the rods terminates in a hook portion for coupling to a handle portion which is located on the back of the marketbasket and toward the top thereof. The other end of the mounting rods is bent around a rigid horizontal bar at the rear top portion of the back portion of the shopping cart after placement thereon, securing the shelf assembly to the shopping cart.

An object of the present invention is the provision of a shopping cart shelf assembly with self-contained mounting hardware.

Another object of the invention is the provision of a shopping cart shelf assembly which is extremely simple to install.

A further object of the invention is the provision of a shopping cart shelf assembly which is inexpensive to manufacture and extremely convenient in use.

Other objects and many of the attendant advantages of the present invention will be readily appreciated as the same becomes better understood by reference to the following detailed description when considered in connection with the accompanying drawings in which like reference numerals designate like parts throughout the Figures thereon and wherein:

FIG. 3 is a top view of the present invention in situ in schematic form; and

FIG. 4 is an exploded perspective view of another embodiment of the present invention.

DETAILED DESCRIPTION OF THE DRAWING

Figure 1:
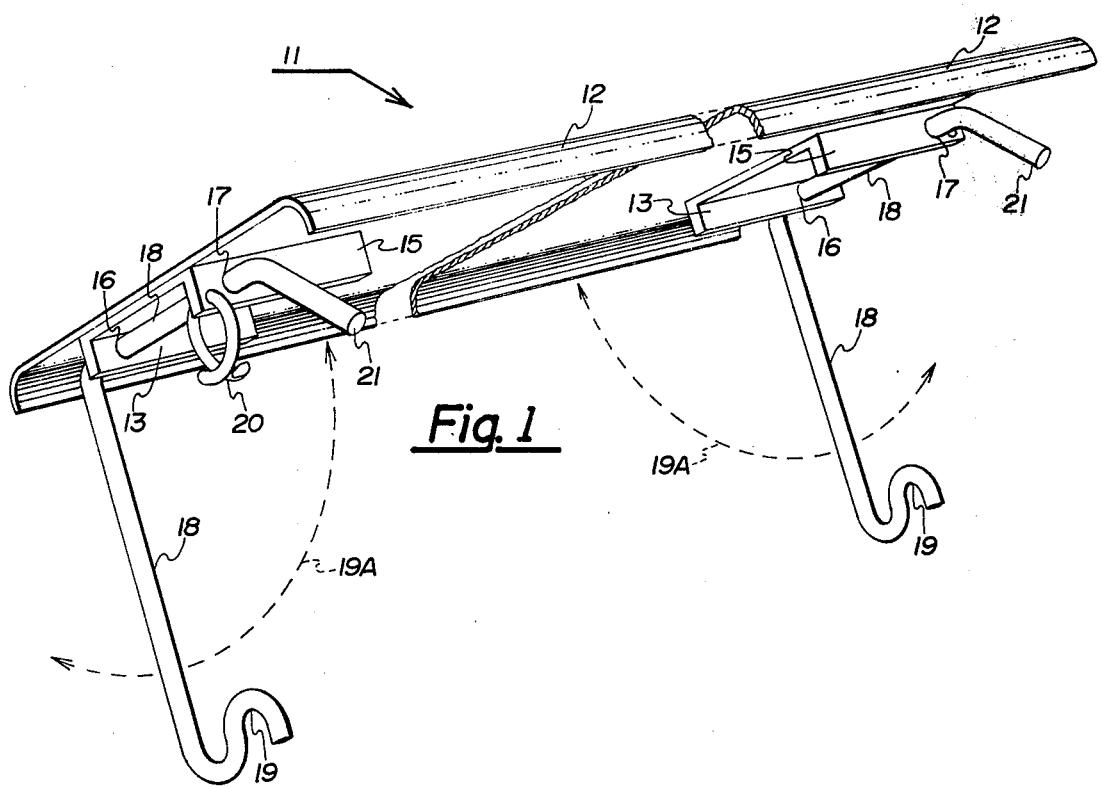
FIG. 1 is a perspective view of the preferred embodiment of the present invention.

Referring to FIG. 1, the shelf assembly of the present invention is shown generally at 11 having a shelf portion 12 carrying two U-shaped mounting bosses 13 at opposite ends of said shelf. Bosses 13 have a pair of apertures 16 and 17 rotatably carrying L-shaped mounting rods 18 through their horizontal section. Each vertical section of mounting rod 18 terminates in a hook portion 19 and each horizontal section terminates in a lock portion 21. Hook portions 19 cooperate with handle assembly bracket 32. U-shaped mounting bosses 13 are attached to shelf member 12 as by riveting.

Figure 2:
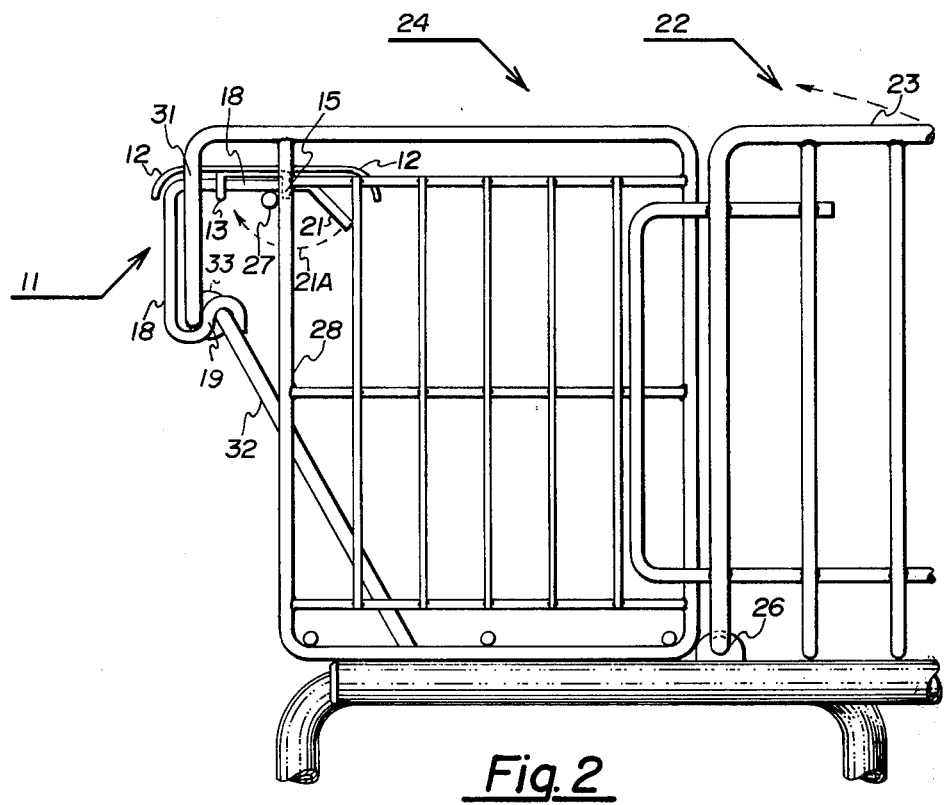
FIG. 2 is a side elevational view of the embodiment of FIG. 1 in FIG. 2.

Referring to FIG. 2, a shopping cart is shown generally at 22 of the type having a front portion 23 and a back portion 24. Front portion 23 rotates counter-clockwise with respect to back portion 24 until it is 90°removed from the position shown at pivot point 26. Back portion 24 has a horizontal structural frame member 27 fixedly attached to vertical members 28 (only one of which is shown). Back section 24 of shopping cart 22 terminates in a handle mounting bracket 31 which together with handle bracket 32 carries handle 33. Hook portion 19 of mounting rod 18 is shown snapped onto one end of handle 33. Locking portion 21 of mounting 18 is shown via broken arrow 21A adapted for bending around crossbar member 27 for locking shelf assembly 11 into place between the handle 33 and crossbar member 27 of shopping cart 22.

Referring to FIG. 3, shopping cart 22 is shown with back portion 24. Crossbar member 27 and handle 33 carry shelf member 12 thereon. Countersunk rivets 25 are shown on the top surface of shelf member 12 which fixedly couple U-shaped mounting bosses 13 to shelf member 12.

Referring to FIG. 4, shelf portion 12 has mounting holes 25A. Mounting strap 18A has mounting apertures 36 which cooperate with Dzus fasteners 36 through apertures 25A in shelf member 12. Mounting strap 18A has a lower mounting hook portion 19A for coupling to a handle portion of a shopping cart such as shown at 33 in FIG. 2 and portion 21A of mounting strap 18A is bent around a crossbar member as shown at 27 in FIGS. 1 and 2 locking mounting strap 18A together with shelf member 12 in place.

Referring back to FIGS. 1, 2, and 3, it can be seen that if shelf assembly 11 is rotated counterclockwise (FIG. 2) hook portions 19 of mounting rods 18 can be disengaged and the shelf assembly removed. The opposite is true on assembly. Mounting the shelf assembly 11 merely involves setting hook portions 19 at the ends of handle assembly 33 and rotating the shelf clockwise until the front portion 15 of U-shaped mounting bosses 13 is in front of crossbar member 27 of marketbasket 22. At this point the two locking portions 21 of mounting rods 18 are bent in the direction of arrow 21A until they lock over crossbar member 27. The shelf assembly is now locked in place and ready for use. It can be further seen that the child-carrying back portion 24 of market-basket 22 has not been blocked to the point where a child will not fit therein, with shelf assembly 11 giving a child a small table on which to rest. It can also be seen that the mounting rods 18 having a circular cross-section will rotate around an axis perpendicular to the length of the shelf portion 12 and as shown by dotted arrows 19A and to a central flat position for shipping purposes.

Ring 20 can be received by an aperture in boss 13 for locking crossbar member 27 therein as an alternative to bending mounting rod lock portion 21. In this case, portion 21 would be straight and, hence, trapped between the curved edges of shelf 12.

Referring back to FIG. 4, an alternate construction is shown whereby the U-shaped mounting boss is eliminated and the mounting strap 18A is connected directly to shelf member Dzus fittings 37. Here, after initial assembly, curved portion 21A is bent around the crossbar resulting in a fixed installation. When it is desired to remove shelf 12, either curved portion 21A or curved portion 19A is straightened and the entire assembly removed.

It should be understood, of course, that the foregoing disclosure relates to only preferred embodiments of the invention, and that it is intended to cover all changes and modifications of the example of the invention herein chosen, for the purposes of the disclosure, which do not constitute departures from the spirit and scope of the invention.

The invention claimed is:

1. On a shopping cart of the type utilized by customers in retail outlets, in which a substantially horizontally rectangular cross-sectioned marketbasket terminating in its upper back portion in a rigid horizontal crossbar member is mounted on wheels or castered and has a rearwardly protruding handle parallel to and in a lower position in relation to said crossbar member for pushing the cart, the improved shopping cart shelf assembly comprising:
    a flat substantially rectangular shelf;
    two L-shaped mounting rods respectively extending downwardly from opposite ends of said shelf member, said mounting rods being spaced apart a distance substantially equal to the length of the handle; and means for rotatably coupling said mounting rods through their horizontal section to the lower surface of said shelf member around an axis perpendicular to the length of said shelf member so that the vertical sections of said rods can be folded to a central flat position for shipping purposes, the vertical section of each mounting rod terminating in a hook portion dimensioned for receiving a side of said handle, and the end of the horizontal section bending downward to lock over said crossbar member when said hook portions are coupled to said handle.

2. The improved shopping cart shelf assembly of claim 1 wherein said means for rotatably coupling comprise:
    at least one U-shaped boss bracket coupled to the bottom surface of said shelf member.

3. On a shopping cart of the type utilized by customers in retail outlets, in which a substantially horizontally rectangular cross-sectioned marketbasket terminating in its upper back portion in a rigid horizontal crossbar member is mounted on wheels or castered and has a rearwardly protruding handle parallel to and in a lower position in relation to said crossbar member for pushing the cart, the improved shopping cart shelf assembly comprising:
    a flat substantially rectangular shelf member;
    two L-shaped mounting rods respectively extending downwardly from opposite ends of said shelf member, said mounting rods being spaced apart a distance substantially equal to the length of the handle; means for rotatably coupling said mounting rods through their horizontal section to the lower surface of said shelf member around an axis perpendicular to the length of said shelf member so that the vertical sections of said rods can be folded to a central flat position for shipping purposes, the vertical section of each mounting rod terminating in a hook portion dimensioned for receiving a side of said handle; and
    locking means coupled to said shelf member, said locking means locking said shelf member to said crossbar member.

4. The improved shopping cart shelf assembly of claim 3 wherein said means for rotatably coupling comprise:
    at least one U-shaped boss bracket coupled to the bottom surface of said shelf member.

5. The improved shopping cart shelf assembly of claim 4 wherein:
    said locking means comprise a locking ring coupled to said boss bracket.

* * * * *